United States Patent [19]

Hung

[11] Patent Number: 5,035,005

[45] Date of Patent: Jul. 30, 1991

[54] INFLIGHT HEADSET FOR CIVIL AIRCRAFT

[76] Inventor: Huang C. Hung, No. 379-14, Pen Kuan Rd., Ta Hwa Village, Niao Sung Hsiang, Kaohsiung Hsein, Taiwan

[21] Appl. No.: 558,769

[22] Filed: Jul. 27, 1990

[51] Int. Cl.⁵ .......................... A42B 1/06; H04R 25/00
[52] U.S. Cl. ........................................ 2/209; 379/430; 381/183; 381/187; 381/188
[58] Field of Search ..................... 2/209, 423; 181/129; 379/430; 381/25, 183, 187, 188

[56] References Cited

U.S. PATENT DOCUMENTS

| | | | |
|---|---|---|---|
| 2,237,752 | 4/1941 | Clarke | 379/430 |
| 2,782,423 | 2/1957 | Simon et al. | 2/209 |
| 3,440,663 | 4/1969 | Beguin | 2/209 |
| 3,457,565 | 7/1969 | Simpson et al. | 2/209 |
| 3,796,841 | 3/1974 | Gorman | 379/430 |
| 4,189,788 | 2/1980 | Schenke et al. | 2/209 |
| 4,463,223 | 7/1984 | Yamanoi et al. | 2/209 |
| 4,471,496 | 9/1984 | Gardner, Jr. et al. | 2/423 |
| 4,472,607 | 9/1984 | Houng | 381/183 |
| 4,654,883 | 3/1987 | Iwata | 379/430 |

FOREIGN PATENT DOCUMENTS

| | | | |
|---|---|---|---|
| 0071464 | 2/1983 | European Pat. Off. | 381/187 |
| 2159366 | 11/1985 | United Kingdom | 379/430 |

*Primary Examiner*—Peter Nerbun
*Assistant Examiner*—Michael A. Neas
*Attorney, Agent, or Firm*—Merchant, Gould, Smith, Edell, Welter & Schmidt

[57] ABSTRACT

An inflight headset includes a headband, a pair of shanks coupled to the ends of the headband, and a pair of earpieces adapted to be disposed over the ears of a user. A stub is provided on a lower end of each shank. A casing with an open end is formed on a housing which is adapted for receiving the earpiece. A cap is provided for enclosing the open end of the casing. The stub is rotatably and frictionally coupled to the casing when the cap encloses the open end of the casing so that the earpieces can be easily adjusted to different rotational directions.

3 Claims, 4 Drawing Sheets

INFLIGHT HEADSET FOR CIVIL AIRCRAFT

BACKGROUND OF THE INVENTION

The present invention relates to a headset, and more particularly to an inflight headset for civil aircraft.

Various kinds of headsets had been developed. Three examples of the headsets are disclosed in U.S. Pat. No. 3,447,160 to Teder; U.S. Pat. No. 3,908,200 to Lundin; and U.S. Pat. No. 4,189,788 to Schenke et al. Generally, the headsets are adjustable to different lengths only, the direction of the earpieces of the headsets are fixed and are not adjustable. This is inconvenient.

The present invention has arisen to mitigate and/or obviate the afore-described disadvantages of the conventional headsets.

SUMMARY OF THE INVENTION

The primary objective of the present invention is to provide an inflight headset for civil aircraft, in which the earpieces of the inflight headset can be adjusted to different directions.

In accordance with one aspect of the invention, there is provided an inflight headset for civil aircraft which includes a headband, a pair of shanks coupled to the ends of the headband, and a pair of earpieces adapted to be disposed over the ears of a user. A stub with an annular groove is provided on a lower end of each shank. A casing with an open end is formed on a housing which is adapted for receiving the earpiece. An oblong hole is formed in an upper end of the casing. A cap is provided for enclosing the open end of the casing. The annular groove of the stub is engaged with the oblong hole of the casing so that the stub is rotatably and frictionally coupled to the casing when the cap encloses the open end of the casing, and so that the earpieces can be easily adjusted to different rotational directions.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
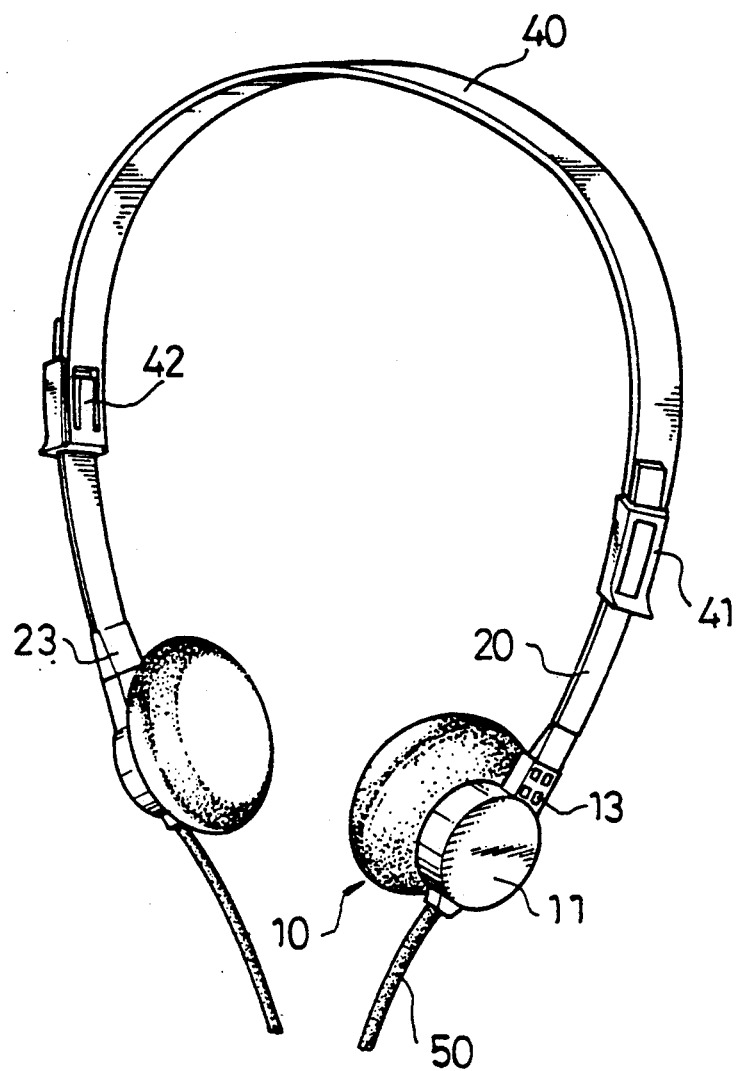
FIG. 1 is a perspective view of an inflight headset for civil aircraft in accordance with the present invention.

Referring to the drawings and initially to FIG. 1, an inflight headset in accordance with the present invention comprises generally a U-shaped headband 40 and a pair of earpieces 10 attached to the downwardly depending ends of a pair of shanks 20 which are coupled to the headband 40. The earpieces are adapted to be disposed over the ears of a user. A wire 50 is attached to each earpiece 10 for supplying electric power thereto.

Figure 2:
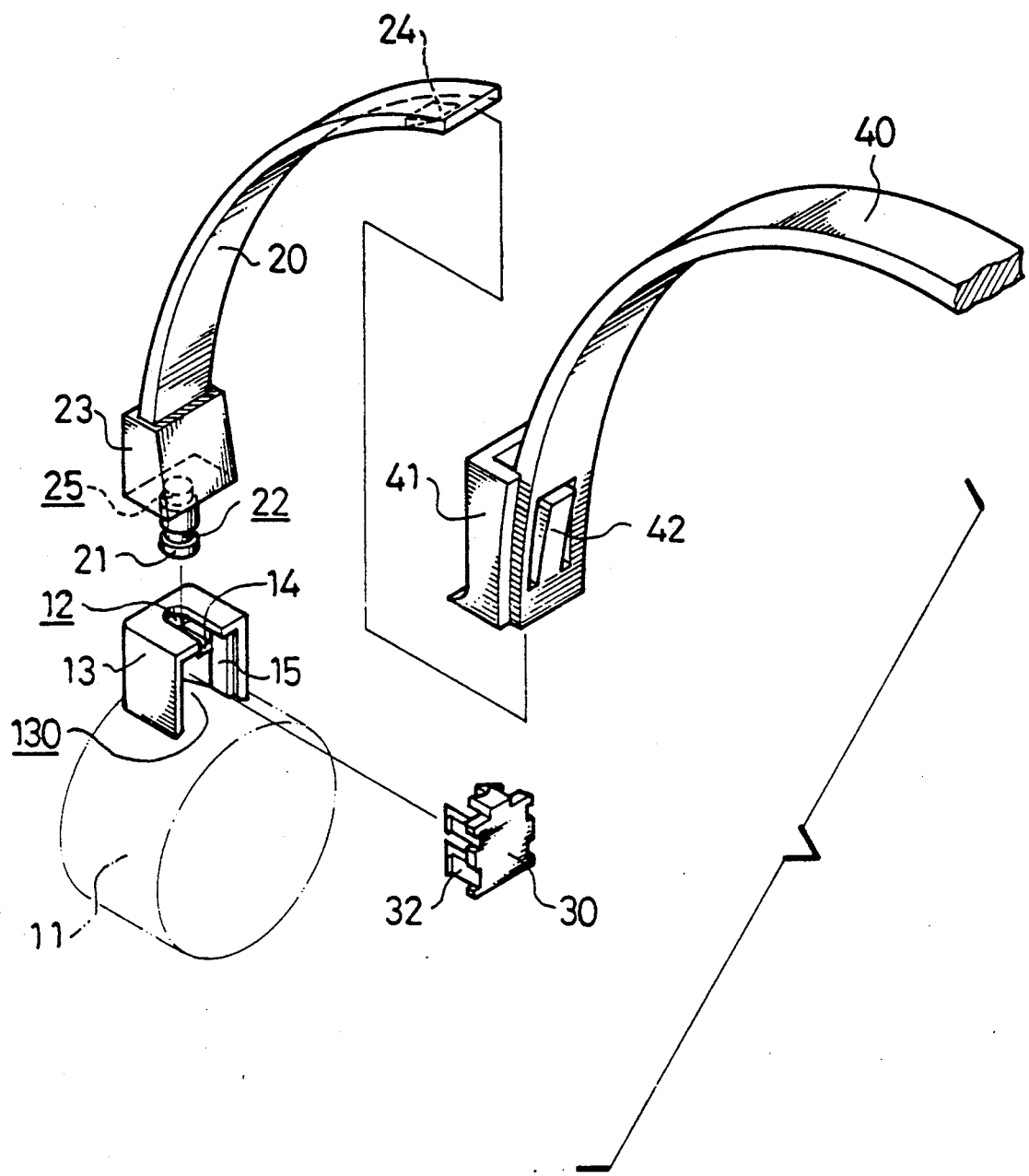
FIG. 2 is a partial exploded view of the inflight headset.
Figure 3:
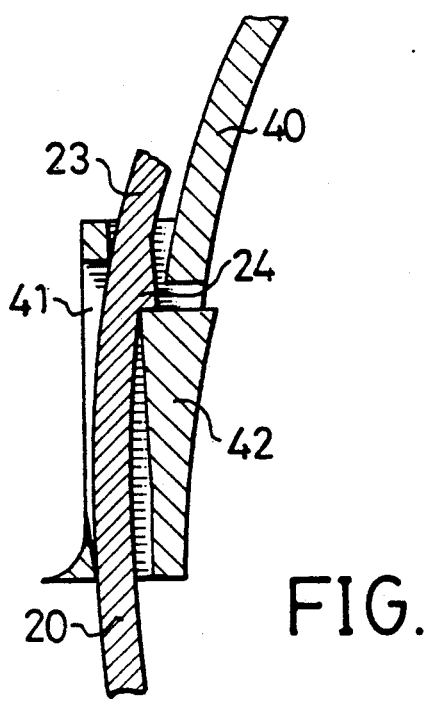
FIG. 3 is a partial cross sectional view illustrating an engagement between the headband and the shank.

Referring next to FIGS. 2 and 3, the headband 40 is a resilient band, each end of which has a rectangular frame 41 integrally fixed to an outer surface thereof. A resilient pawl 42 is formed in the inner surface of each end of the headband 40. An upper end of the shank 20 which has a wedge 24 formed in an inner surface thereof is insetable through the frame 41. A stop 23 is integrally formed on the lower end of each shank 20, and a stub 21 is integrally fixed to the lower end of each stop 23. Two annular grooves 22, 25 are formed in the stub 21. The shank 20 and the frame 41 are arranged such that the pawl 42 urges the shank 20 against the inner surface of the frame 41 thereby providing a slidable, frictional engagement. The wedge 23 of the shank 20 prevents the shank 20 from being separated from the headband 40.

Referring next to FIGS. 4, 5 and 6 and again to FIG. 2, a casing 13 which has an open end 130 is integrally formed on an upper end of each housing 11 which is adapted for receiving a respective earpiece 10. An oblong hole 12 is formed in an upper end of the casing 13. A partition wall 14 which has an oblong hole 140 formed therein is integrally formed in the casing 13. As is best shown in FIG. 6, the annular grooves 22, 25 of the stub 21 are engaged with the upper end wall and the partition wall 14 respectively when the stub 21 is inserted into the casing 13 from the open end 130 thereof. A pair of ribs 15 are vertically formed in the inner surfaces of the casing 13 and one of them faces to the other.

Figure 5:
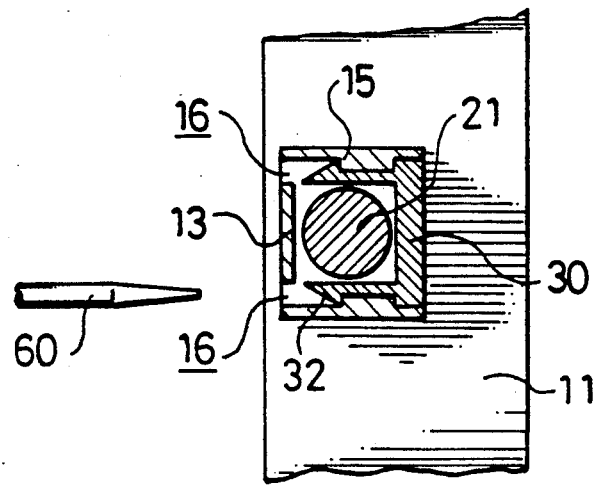
FIGS. 5 and 6 are partial cross sectional views illustrating an engagement between the headband and the earpiece.
Figure 6:
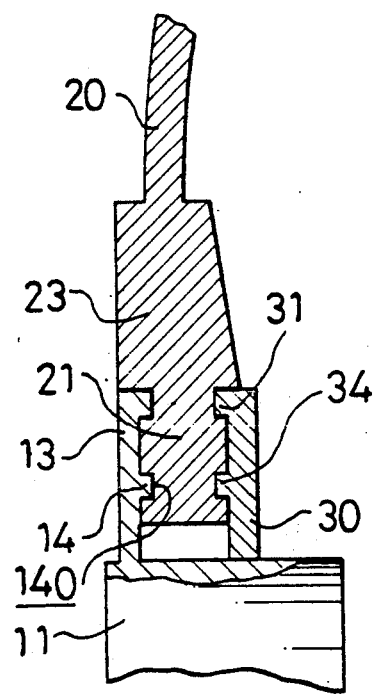

A cap 30 which is adapted for enclosing the open end 130 of the casing 13 comprises two pairs of hooks 32 which are adapted to engage with the ribs 15, best shown in FIG. 5. A first block 31 with a semi-circular recess 33 is integrally formed on an upper end of the cap 30. A second block 34 is integrally formed on a middle portion of the cap 30 and has a semi-circular recess formed in the front end thereof. When the cap 30 is pushed to enclose the open end of the casing 13, the first block 31 is engaged in the oblong hole 12 so that the inner end of the oblong hole 12 and the semi-circular recess 33 of the first block 31 form a circular hole in order to engage with the upper annular groove 25 of the stub 21. The second block 31 is engaged in the oblong hole 140 of the partition wall 14 so that the oblong hole 140 and the semi-circular recess of the second block 34 of the cap 30 also form a circular hole in order to engage with the lower annular groove 22 of the stub 21 so that the stub 21 is rotatably and frictionally retained in the casing 13, thereby providing a slidable, frictional engagement between the stub 21 and the casing 13. The rotational direction of the earpiece 10 which is coupled to the housing 11 can thus be easily adjusted.

Figure 4:
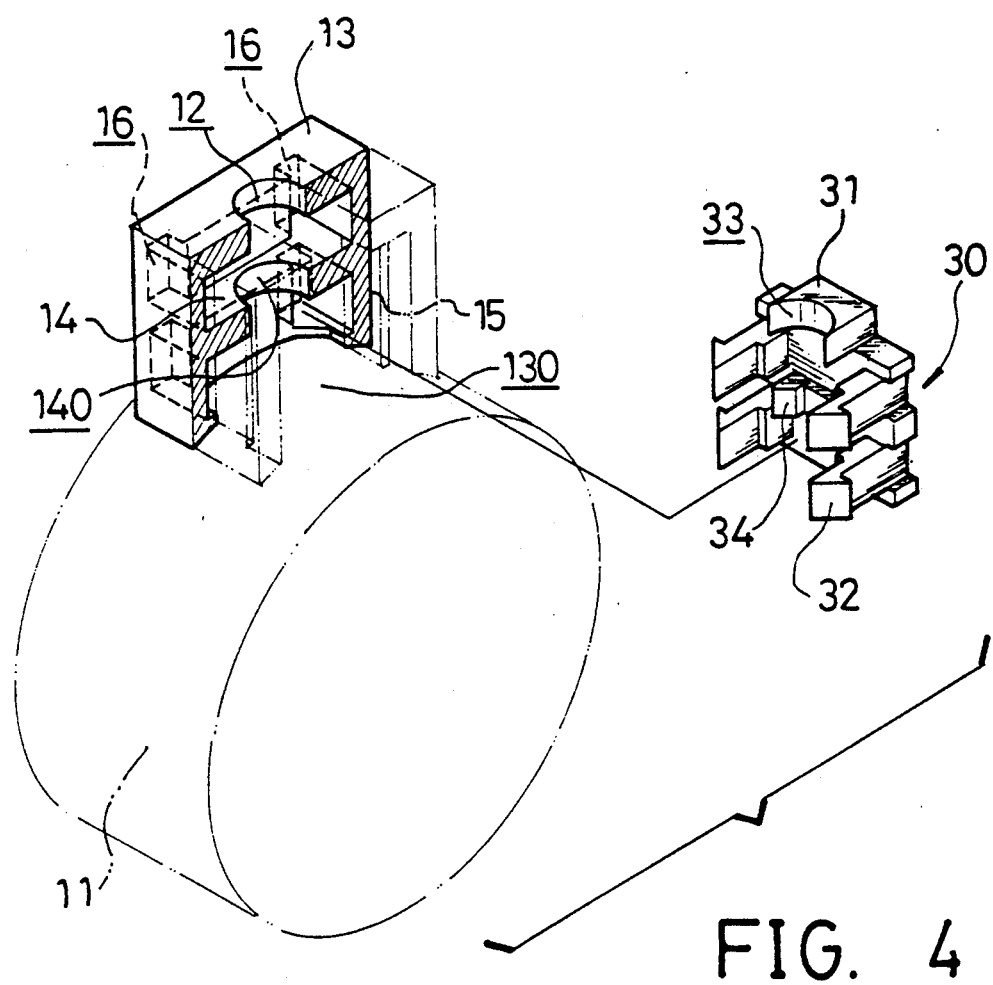
FIG. 4 is a partial exploded view of the earpiece portion.

As shown in FIGS. 4 and 5, two openings 16 are formed in the rear end wall of the casing 13. The hooks 32 of the cap 30 can be easily separated from their engagements with the ribs 15 of the casing 13 when a sharp edge of a tool 60 is inserted into each opening 16 of the casing 13.

Accordingly, the headset in accordance with the present invention has a stub 21 of a shank 20 rotatably engaged with the casing 13 so that the rotational directions of the earpieces can be easily adjusted.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An inflight headset comprising generally a headband having two downwardly depending ends, a pair of shanks coupled to said downwardly depending ends of said headband, and a pair of earpieces which are coupled to said shanks being provided to be disposed over the ears of a user; a stub being provided on a lower end of each said shank, a first annular groove being formed in said stub; a casing being integrally formed on a housing which receives a respective earpiece, said casing having an open end, a first oblong hole being formed in an upper end of said casing; a cap being provided for enclosing said open end of said casing; said first annular groove of said stub being engaged with said first oblong hole, and said stub being rotatably and frictionally coupled to said casing when said cap encloses said open end of said casing so that said earpieces can be easily adjusted to different rotational directions.

2. An inflight headset according to claim 1, wherein a second annular groove is formed in said stub in parallel relation to said first annular groove; a partition wall is laterally formed in said casing and a second oblong hole is formed in said partition wall, said second annular groove of said stub is engaged with said second oblong hole, and said stub is rotatably and frictionally coupled to said casing when said cap encloses said open end of said casing so that said earpieces can be easily adjusted to different rotational directions.

3. An inflight headset according to claim 2, wherein a rib is vertically formed on an inner surface of each lateral side of said open end of said casing, at least one pair of hooks are formed on said cap for engagement with said ribs of said casing when said cap is pushed to enclose said open end of said casing; a first block is integrally fixed to an upper end of said cap, and a first semi-circular recess is formed in said first block; a second block is integrally formed on a middle portion of said cap, and a second semi-circular recess is formed in said second block; when said cap is pushed to enclose said open end of said casing, said first block and said second block are engaged in said first oblong hole and said second oblong hole of said casing respectively, said first semi-circular recess of said first block joins said first oblong hole to form a first circular hole for engagement with said first annular groove of said stub, and said second semi-circular recess of said second block joins said second oblong hole to form a second circular hole for engagement with said second annular groove of said stub so that said stub is rotatably and frictionally coupled to said casing.

* * * * *